Dec. 25, 1934.  R. HAMILTON  1,985,777
TRACTOR
Filed Dec. 12, 1930  2 Sheets-Sheet 2
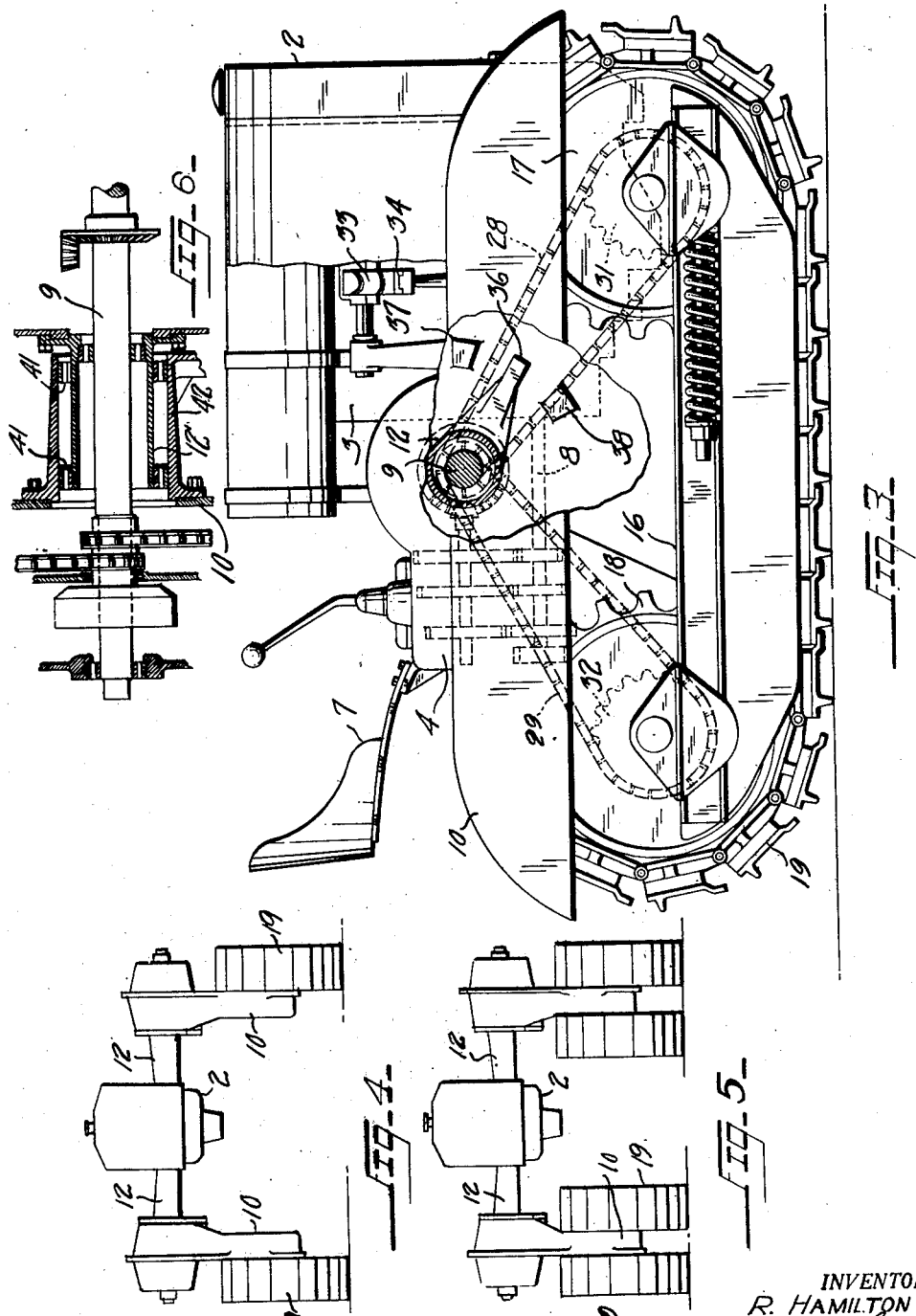
INVENTOR.
R. HAMILTON
BY Joseph B. Gardner
ATTORNEY

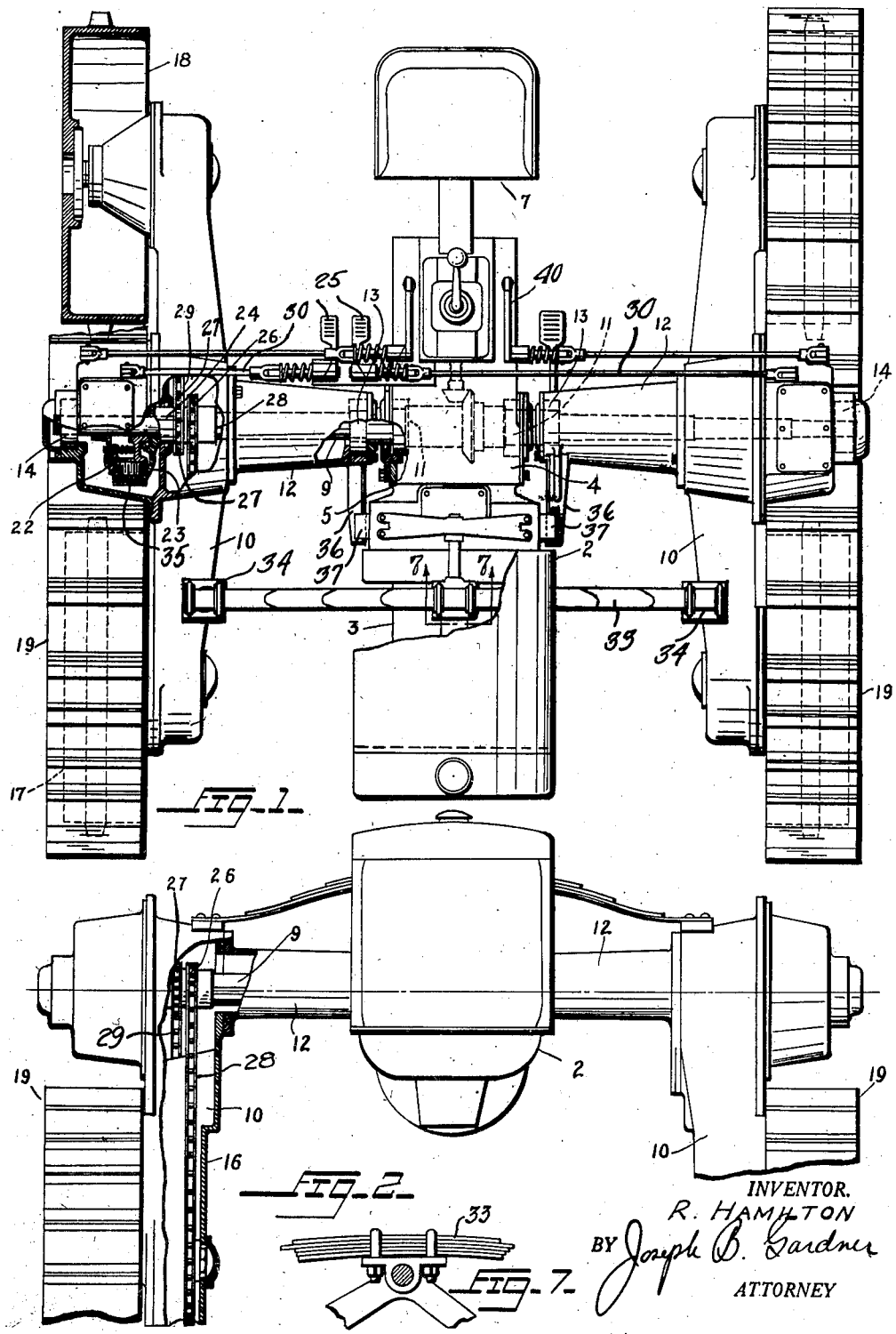

UNITED STATES PATENT OFFICE 1,985,777

TRACTOR

Rush Hamilton, Piedmont, Calif.

Application December 12, 1930, Serial No. 501,790

4 Claims. (Cl. 180—9.1)

The invention relates to a new mechanical design of tractor.

An object of the invention is to provide a tractor which will have a maximum flexibility to compensate for any unevenness of ground traversed by the tractor.

Another object of the invention is to provide a tractor which while characterized by a low center of gravity, has a high row-crop clearance whereby the tractor may be used with exceptional advantage both for open field and row crop work.

A further object is to provide a tractor which is readily adaptable for effecting variations in the tread thereof, such as desirable for different widths of row-crop.

A still further object of the invention is to provide a tractor which affords a maximum clearance between the wheels for any given tread.

Yet another object is to provide a tractor embodying an efficient four wheel drive.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a plan view of the tractor with parts broken away and shown in section.

Figure 2 is a fragmentary front view of the tractor with parts shown in section.

Figure 3 is a side view of the tractor partly in section.

Figure 4 is a front view of the tractor on a small scale.

Figure 5 is a view similar to Figure 4, but showing a slightly modified form of the tractor.

Figure 6 is a fragmentary sectional view showing a modified form of the wheel truck and driving axle arrangement.

Figure 7 is a fragmentary end view of the pivotal connection of the power unit and supporting spring therefor taken substantially on the line 7—7 of Figure 1.

The tractor of my invention in its present embodiment is of the four-wheel-drive and tracklayer type, but it will be understood that the tractor may be arranged for wheel-drives of other types and that furthermore the wheels may be arranged for direct traction with the ground instead of driving chains of track links.

As here illustrated in the drawings, the tractor comprises a power unit 2 which is positioned to extend longitudinally of the tractor and includes a motor 3 and transmission unit 4. The motor is arranged at the front portion of the power unit and is rigidly secured to the transmission case 5 of the unit 4 which, as clearly shown in Figure 1, lies between the motor and the driver's compartment 7, the latter being fixed to the power unit to form a unitary part thereof.

The power shaft 8 of the engine extends into the transmission case, and the force thereof is communicated through suitable gears for different speed ratios to a driving axle 9. The latter is disposed transversely of the tractor and lies at right angles to the shaft 8 and considerably above same. With the engine shaft thus disposed below the driving axle the center of gravity of the power unit will be relatively low. The power unit, including the driver's compartment, is arranged to be supported practically entirely on the driving axle and is so positioned that substantially equal portions of the weight thereof is at opposite sides of the axle with a slight weight advantage desirably disposed forwardly of said axle. The unit is preferably carried on the axle by means of a pair of spaced roller bearings 11 which permit the unit to oscillate about the center of rotation of the axle.

The axle 9 is desirably formed of one piece and extends from the case to the opposite sides of the tractor. Arranged at the ends of the axle 9 and mounted thereon for oscillation about the axis of rotation thereof are wheel trucks 10. In the preferred embodiment of the invention the trucks are fixedly associated with housings 12 for the axle, and each truck with the associated housing is carried on a pair of roller bearings 13 and 14, one of which is positioned adjacent the transmission casing while the other is located near the end of the axle. With the bearings 13 and 14 thus well spaced and making a unitary whole of the axle, housing, and truck, the stability of the trucks will be effectively accomplished while at the same time the trucks may be oscillated relative to each other and to the power unit.

Each truck comprises a frame 16, in which are mounted tractor wheels 17 and 18 positioned in fore and aft relation and equidistantly from the driving axle. As previously stated, the tractor in its present embodiment is of the track type and accordingly an endless link-track 19 is operatively disposed about the wheels of each truck. Independent driving connections are provided for the wheels of each of the trucks. Arranged on each end portion of the driving axle is a clutch, here shown as of the multiple disc type and comprising clutch elements 22 and 23, the former of which is fixed to the axle for rotation therewith, while the latter is loosely disposed about the axle to allow relative rotation thereof. The element 22 is positioned nearer the end of the axle and lies for the most part, together with the inter-engaging portion of the element 23, substantially in diametrical alignment with the tractor wheels. The element 23 which lies inwardly of the element 22 is provided with an inward extension 24 on which are fixedly carried a pair of sprockets 26 and 27. The latter are respectively connected by means of chains 28 and 29 to sprockets 31 and 32 fixed on the axles of the wheels 17 and 18. It will be seen that with the driving connection designed in the aforementioned manner, that is with the loose clutch element innermost, the clutch unit may be located practically at the extreme end of the driving axle with the tractor wheels retained within diametrical alignment therewith instead of being outwardly thereof with the resultant increase of tread such as required when the loose clutch element is outermost. Operation of the clutches may be effected in any conventional or special manner. As here shown they are operated by foot levers 25 through the medium of rods 30 which are connected to the clutch elements 23. Preferably brakes 35 are associated with the clutches and are operatable by levers 40.

As previously stated, the driving axle 9 is designed to assume practically the entire weight of the power unit together with the driver's compartment. However, in order to retain the unit in a normal horizontal position, the weight of the unit instead of being exactly equally divided on opposite sides of the axle, is so distributed that the greater portion will be to one side, such as forwardly of the axle where the engine is located, and such portion of the unit has a secondary support, which is preferably of a resilient nature. The secondary support as here shown particularly in Figures 1 and 7 is in the form of a leaf spring 33 which is pivotally secured at its center to the top of the motor and is supported at its ends on the forward portion of the trucks. Preferably the ends of the spring have a sliding ball joint connection 34 with the trucks so that when relative oscillation between the trucks and power unit takes place there will be no undue twist or strain on the spring. It will now be clear not only will the weight of the entire unit be effectively carried by the trucks, but each truck, together with the wheels and track associated therewith, may readily oscillate relative to the other truck and associated members or the power unit so that regardless of how uneven the ground may be on which the tractor is riding, a two-point contact between each truck unit and the ground will at all times be had.

In order to prevent an undue degree of oscillation between the trucks and the power unit, co-operating means are associated with said members to limit their oscillation. Fixed to each axle housing is an arm 36, the outer end of which is arranged upon relative oscillation of the truck and unit to move between lugs 37 and 38 fixed to the unit. The spacing of the lugs is preferably such as to allow a relative oscillation of about 30 degrees between each truck and the unit and thus about 60 degrees between the trucks. Any tilt of the trucks in excess of the forementioned will be resisted by the weight of the unit.

In Figure 6 I have shown a somewhat modified form of the truck and axle housing assembly. In this embodiment the axle housing 12' instead of being rigidly related to the truck frame, is bolted or otherwise made fast to the power unit, and the truck is mounted for oscillation on such housing. Preferably a pair of spaced bearings 41 are provided between the housing and a secondary housing 42 which is fixed to the truck frame and encloses the housing 12'. It will be evident that with this arrangement an extremely sturdy construction is provided and one that is well adapted, in common with other features of this invention, for use in heavy duty automobile trucks.

It will also be noted that with the truck wheels mounted as a unitary part of the truck as in my invention, said wheels may be readily placed on the inner side of the truck so as to reduce the width of the tractor tread, or if desired as shown in Figure 5 a set of wheels may be placed on the inner side of the truck as well as on the outer side whereby an increased traction is afforded.

That the construction and design of the tractor is well adapted to the accomplishment of the objects hereinbefore mentioned is now clear.

I claim:

1. In a tractor, a unitary driving axle, a power unit rotatably supported thereby and having a driving connection therewith at an intermediate portion thereof, a housing for said unit, bearing units for said axle at opposite sides of and adjacent said intermediate portion, bearing units for said axle adjacent the ends thereof, and a fixedly related axle housing and truck at each side of said axle portion carried on said bearing units for oscillation relative to said power unit housing.

2. In a tractor, a power and body unit extending longitudinally of the tractor and comprising a motor, a speed-change driving transmission, and an operator's compartment, all fixedly arranged in the order named; a driving axle extending from said transmission transversely of the tractor and supporting said unit; and a truck operatively connected with said axle and having tractor wheels equidistantly positioned from said axle at opposite sides thereof.

3. In a tractor, a power unit, a driving axle having a driving connection with said unit at an intermediate portion of said axle, a truck carried at an end portion of said axle, a tractor wheel carried by said truck, a clutch member fixed to said axle for rotation therewith and arranged in substantially diametrical alignment with said wheel, a complementary clutch member loose on said axle to permit relative rotation thereof and positioned inwardly of said first clutch member, and driving connections between said second member and said wheel positioned inwardly of said wheel.

4. A tractor comprising a transversely extending driving axle, a power unit connected to and depending from an intermediate portion of said axle, wheel trucks mounted in depending relation from and for oscillation about the opposite ends of said axle and spaced laterally from said power unit to define between the trucks and unit a pair of vertically extending spaces arranged to span crop rows, tractor wheels carried by said trucks and driven by said axle, and a spring extending transversely of the tractor and having its ends secured to said trucks above said axle and pivotally connected intermediate its ends to said unit above said axle whereby the upper extremity of said spaces will be at least as high from the ground as said axle.

RUSH HAMILTON.